McCaffrey

[11] Patent Number: 4,606,716
[45] Date of Patent: Aug. 19, 1986

[54] MOLD AND BISCUIT CUTTER
[76] Inventor: Charles N. McCaffrey, P.O. Box 2001, Hattiesburg, Miss. 39401
[21] Appl. No.: 622,325
[22] Filed: Jun. 19, 1984
[51] Int. Cl.⁴ .......................... A21C 5/00; A21C 11/10
[52] U.S. Cl. ..................................... 425/289; 30/130; 30/301; 30/316
[58] Field of Search ................. 30/301, 130, 315, 316, 30/305; 426/503; 425/289

[56] References Cited
U.S. PATENT DOCUMENTS

| | | | |
|---|---|---|---|
| 337,329 | 3/1886 | Hewett | 30/301 |
| 489,647 | 1/1893 | Coe | 30/303 |
| 1,299,802 | 4/1919 | Smith | 30/301 |
| 1,399,449 | 12/1921 | Trethewey | 30/301 |
| 1,477,693 | 12/1923 | Clark | 30/301 |
| 3,234,895 | 2/1966 | Leiby | 426/503 |
| 3,899,962 | 8/1975 | Federico | 426/503 |
| 4,055,892 | 11/1977 | de Vecchio | 30/303 |

FOREIGN PATENT DOCUMENTS

| | | | |
|---|---|---|---|
| 203375 | 7/1954 | Australia | 30/301 |
| 564523 | 6/1957 | Italy | 30/305 |

Primary Examiner—Willard E. Hoag
Attorney, Agent, or Firm—Dowell & Dowell

[57] ABSTRACT

A cutter comprising a plurality of contiguous hexagonal shapes with a closely-fitting mold surrounding the cutter.

6 Claims, 6 Drawing Figures

MOLD AND BISCUIT CUTTER

BACKGROUND OF THE INVENTION

1. Field of the Invention

This invention relates generally to food preparation and specifically to a method of forming biscuits using a mold and a cutter designed to cooperate with the mold to form a plurality of biscuits wherein a predetermined amount of a biscuit dough is prepared using a packaged mix which when kneaded with water and placed within the mold will fill the mold to an appropriate level so that the biscuits created by the cutter will be of uniform quality and size when baked.

2. History of the Prior Art

The present invention has its primary utility in use with fast-food restaurant services. One of the most popular items currently available in fast-food restaurants are biscuits. Many franchise systems have developed elaborate advertising campaigns to encourage the sale of various biscuit type meals especially for breakfast.

The problem associated with preparing mass quantities of biscuits is that the uniformity and quality of the dough from which the biscuits are made varies from batch to batch. When dealing with large volumes, the amount of waste which results from making biscuits due to trimmings and excesses of dough which are severed from rolled dough by a biscuit cutter adds significantly to the cost of the preparation of the biscuits. In addition if such excess dough is reintroduced into a fresh batch of dough the reworked portion of the batch may adversely effect the overall quality of the resulting biscuits.

In prior art biscuit making processes, biscuits were made from scratch by individuals having a talent or being trained to combine the appropriate ingredients based upon whatever biscuit recipe was used. In high volume fast-food restaurants, it is desirable to provide a biscuit dough which is of uniform quality from batch to batch regardless of the individual who is preparing each batch. This uniformity should not only extend from person to person but from franchise establishment to franchise establishment, or from restaurant to restaurant.

There have been a number of prior art devices which have been developed to produce a quantity of biscuits in a single cutting. In U.S. Pat. 337,329 to Hewett, a biscuit cutter is disclosed having a plurality of hexagonally shaped cutting elements which are joined into a single cutter. In use, the biscuit cutter of Hewett could effectively operate to cut a plurality of hexagonally shaped from a single rolled layer of biscuit dough. Other prior art biscuit cutters are similar to that of U.S. Pat. No. 1,299,802 to Smith. Such cutters as disclosed in Smith include a plurality of molds or cutter elements of cylindrical shape which are moveably mounted with respect to a supporting surface where the dough has been rolled and ready for cutting. Other examples of prior art cutting devices include U.S. Pat. No. 1,399,449 to Trethewey; and 1,477,693 to Clark.

Through the use of the aforementioned biscuit cutters, it can be seen that a plurality of biscuits may be cut from a rolled layer of biscuit dough. The problem remains, however, that for each cut made with the cutting elements, an excess amount of dough would be left to either be reworked or discarded. In addition, there is no cooperation taught between a predetermined amount of biscuit mix and the volume of a biscuit mold to insure a uniform size and quality of the dough being used to make the biscuits, and, therefore, the quality and size of biscuit, obtained with prior art biscuit preparation methods depends upon the ingredients and amounts used in each batch.

SUMMARY OF THE INVENITION

This invention is directed to a system and apparatus for producing a plurality of uniform batches of biscuits wherein the uniformity of each batch is insured by providing a mold having a specially shaped cavity therein in which a predetermined amount of biscuit dough which has been kneaded is uniformly distributed. After the biscuit dough has been uniformly distributed throughout the cavity of the mold, a special cutter having a plurality of straight cutting edges which are disposed at angles with relationship to one another is introduced in cooperative engagement within the mold and thereby serves to cut the biscuit dough into a plurality of multisided biscuits which when heated will assume a uniform thickness and be generally circular in shape. Generally, the cutting mechanism will have edges for cutting a plurality of biscuits in a single downward stroke and will cooperate with the mold cavity to produce a plurality of biscuits without any appreciable waste of dough.

It is the primary object of this invention to provide a uniform system for preparing biscuits having substantially equal quality without creating waste dough which would otherwise have to be reworked or discarded.

It is another object of this invention to provide an apparatus for preparing a plurality of similarly shaped biscuits wherein a mold cavity and a cutter mechanism cooperatively cut a predetermined amount of dough into a plurality of biscuit shapes without leaving excess dough which must be reworked in a subsequent dough batch.

It is yet another object of the present invention to provide a system for preparing biscuits of uniform quality and size, wherein the dough for each batch is prepared from a premeasured amount of biscuit mix which when blended with a predetermined amount of water and kneaded is thereafter placed within the cavity of a mold having a predetermined volume, and, thereafter, the dough is cut to form a plurality of biscuits.

It is still another object of this invention to provide a system for making biscuits wherein the person preparing the biscuits need not be an expert nor have appreciable knowledge of biscuit making in order to prepare a biscuit dough and thereafter prepare the biscuits in uniform size and quality.

DESCRIPTION OF THE PREFERRED EMBODIMENT

Figure 1:
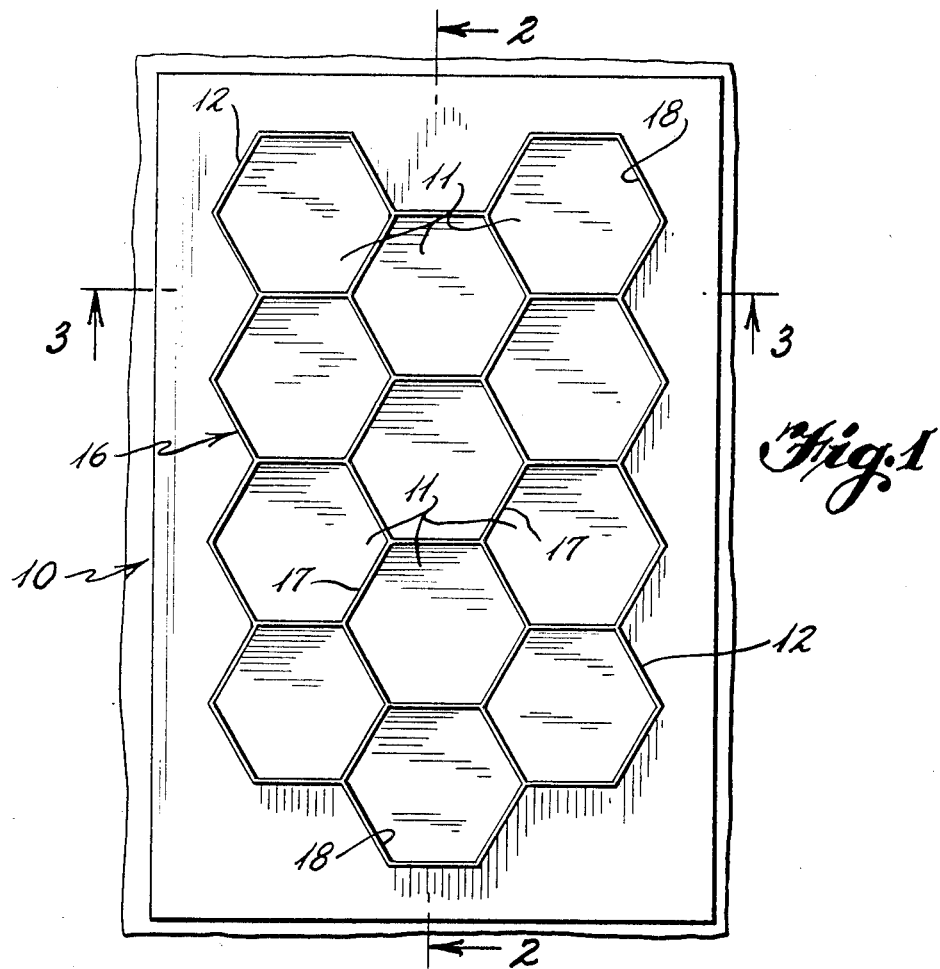
FIG. 1 is a top plan view of the biscuit mold of the present invention showing the multiple hexagon cutter placed therein.
Figure 2:
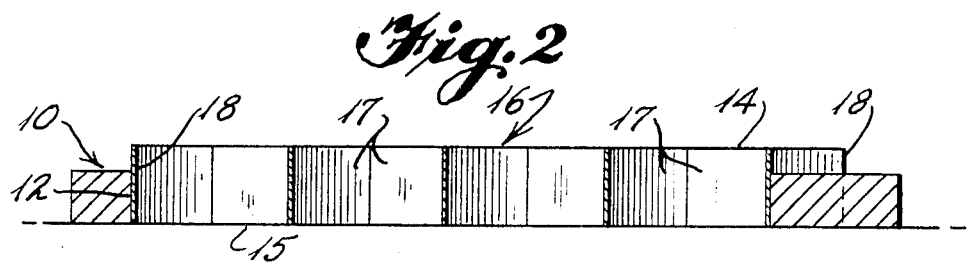
FIG. 2 is a cross-sectional view taken along lines 2—2 of FIG. 1.

As previously discussed, the present invention is directed to a method of preparing a plurality of biscuits of uniform quality in repeated batches wherein the preparer does not have to be proficient in the art of biscuit making. With reference to FIG. 1 of the drawings, a biscuit mold 10 is shown which is generally rectangular in shape and having a cavity 11 formed therein. The cavity is defined by a plurality of sidewall segments 12 which are angularly disposed relative to one another. As shown in FIG. 2, the cavity is formed as an opening which extends through the mold from the upper surface 14 to the lower surface 15 thereof. It is conceived, however, that the cavity may be formed leaving a continuous bottom wall, not shown, which is integrally formed with the remainder of the mold 10.

With continued reference to FIG. 1, the biscuit mold of the present invention is used in cooperation with a biscuit cutter 16 which is shown as consisting of a plurality of straight wall portions 17 which are joined to form a plurality of separate hexagon shaped portions which are part of a unitary assembly. The outer walls 18 of each of the hexagonal shaped portions which form the outside of the unitary cutter 16 are generally coextensive with the proximate sidewall portions 12 of the biscuit mold. In this manner, the shape of the mold cavity is such as to cooperatively receive the cutter 16 with only sufficient space being left between the sidewall portions of the mold and the outer walls of the cutter to permit a sliding engagement therebetween.

The biscuit cutter disclosed in FIG. 1 consists of twelve separate hexagonal portions. It is envisioned that any number of hexagonal portions could be used. The cooperation between the shape of the hexagonal cutters and the angularly related sidewalls of the mold permit the cutter to effectively separate or divide a batch of dough 20 which is placed within the mold cavity into a plurality of biscuits of substantially equal size and volume. In addition, because of the angular relationship of the walls of the mold, when the cutter is urged into cutting relationship within the cavity of the mold, essentially all of the dough contained therein will be formed into the shape of biscuits with little or no excess dough remaining.

In addition to the cooperating cutting relationship between the hexagonal mold and cutter, it has long been known that a biscuit formed in a hexagon shape will assume a generally circular shape when cooked. It is desirable to maintain the circular shape of the biscuit especially in commercial restaurant environments. In this regard, it would be possible to form the sidewalls and the mold cavity and the cutter with shapes differing from a hexagonal shape so long as the close fitting relationship of each of the cutting portions of the unitary cutting element and the sidewall portions of the cavity of the mold act to form the dough contained within the cavity into a plurality of biscuits without leaving any excess dough remaining. Such shapes may include other multi sided shapes having more than five sidewalls including octagons and decagons. The problem with increasing the number of sidewall portions is that the cost of the mold and the cutter is increased.

Figure 3:
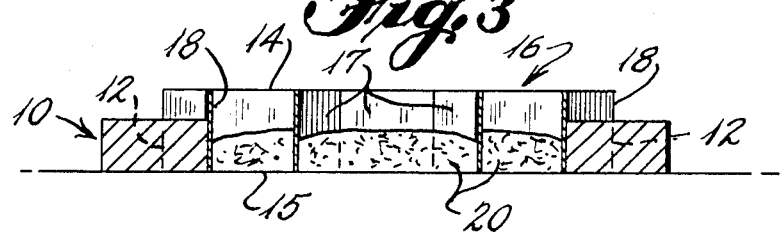
FIG. 3 is a cross-sectional view taken along lines 3—3 of FIG. 1 showing the dough being cut into separate biscuit shapes.

Further, if desirable, some type of handle means may be mounted to extend upwardly from the upper surface of the unitary cutter to aid in its manipulation. The mold may be constructed of various materials including metal, wood or plastic with the cutter element being constructed of a metal or plastic material. As shown in FIGS. 2 and 3, the height of the cutter element is generally somewhat greater than the height of the mold so as to prevent contact of the user's hand with the dough contained within the mold and also to aid in manipulation of the cutter in relationship with the mold.

Figure 4:
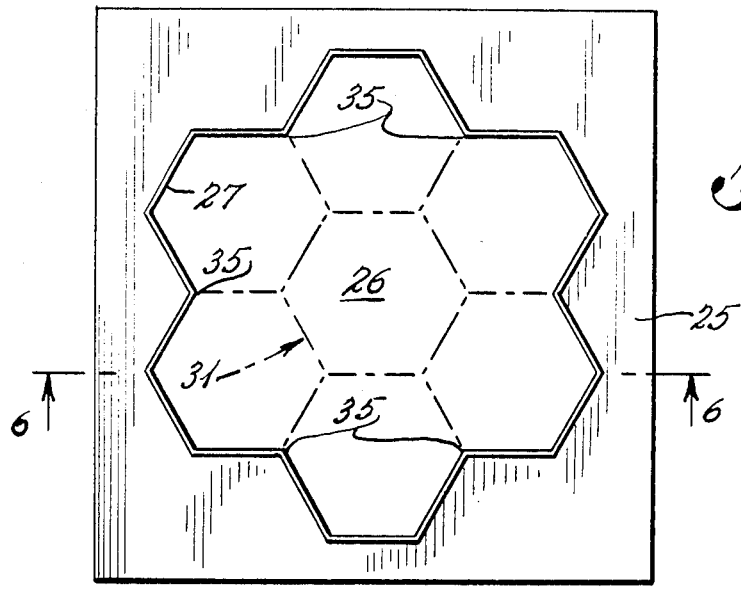
FIG. 4 is a top plan view of an alternate embodiment of the invention.
Figure 5:
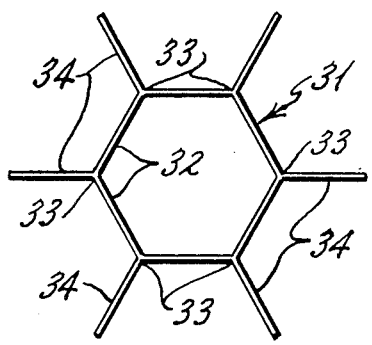
FIG. 5 is a top plan view of the alternate embodiment for a cutter for use with the mold of FIG. 4.
Figure 6:
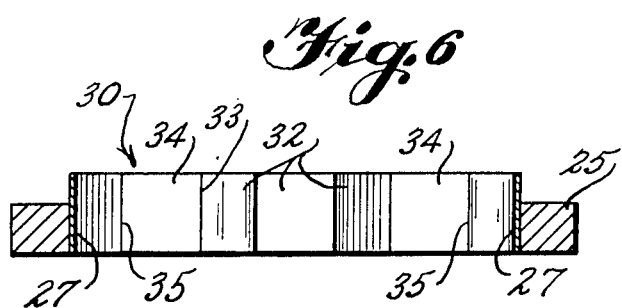
FIG. 6 is a cross-sectional view taken along lines 6—6 of FIG. 4 showing the cutter of FIG. 5 in place within the mold.

In accordance with the foregoing remarks, an alternate embodiment of the invention is disclosed in FIGS. 4 through 6. With particular reference to FIG. 4, in the alternate embodiment, a mold 25 is provided having an opening 26 therein of a shape which is different from the shape in the opening in the mold of FIG. 1. As with the mold of the preferred embodiment, the sidewalls 27 defining the opening 26 through the mold 25 are shown as being disposed in a somewhat zigzag relationship with one another along the periphery of the opening or cavity.

The biscuit cutter 30 for use with the alternate embodiment of the invention is also constructed differently from the biscuit cutter shown in the preferred embodiment. The biscuit cutter 30 includes a single hexagon shaped central portion 31 defined by five straight walls or segments 32 which are joined at their ends such as shown at 33. A plurality of outer wall segments 34 are shown as being attached at one end to the intersection of the wall 32 and extend outwardly therefrom so as to be cooperatively aligned with the inwardly extending apexes 35 which define the intersection between various portions of the zigzag sidewalls defining the inner surface of the cavity of the mold.

With the cutter and mold arrangement of the alternate embodiment, it can be seen that the cutter is of a size to be cooperatively received within the cavity 26 of the mold 25 to thereby cooperatively separate such cavity into seven hexagonally shaped portions. Therefore, seven biscuits may be formed using the mold and cutter of the alternate embodiment with a single cutting movement of the cutter relative to the mold cavity.

In the method of preparing biscuits in accordance with the present invention, the volume of the mold cavity is known. A biscuit mix having the desired ingredients is prepared and packaged. Such packaging may be performed at a location remote from the point of ultimate use. The quantity of ingredients in each package, is predetermined to form a dough which will fill a particular mold to a desired depth after the dry ingredients have been blended with water and kneaded to get the material to a dough like consistency. For example, it would take less dough to fill the cavity of the mold in FIG. 4 than that of the mold in FIG. 1.

The prepared biscuit dry mix generally consists of a self-rising flour to which shortening, buttermilk, and leavening have been added. When combined with water and kneaded, the mix is placed into the mold cavity and leveled either by hand or some other means so that the depth of the dough within the mold is generally uniform. Generally, the level of dough within the mold cavity should be between ⅜ths of an inch to ½ inch in depth. After the dough within the cavity of the mold has been cut, the mold is lifted from the working surface and thereafter the individual biscuits are placed on a waiting cooking tray of sheet in spaced relationship with one another so as to permit their expansion during cooking. It is envisioned that in commercial usage, the biscuit mix will be made available in a plurality of sizes with each size corresponding to the proper amount of ingredients to be used with the particular mold being used.

I claim:

1. An apparatus for preparing a plurality of biscuits from a batch of dough without leaving any waste or excess dough comprising a mold having a cavity therein in which the dough is evenly received, said cavity being defined by a plurality of generally straight side wall portions which are disposed in a zigzag relationship with respect to one another around the periphery thereof, a cutter element cooperatively receivable within said cavity and dividing said cavity into a plurality of equal volumes, said cutter element having a plurality of substantially straight wall segments which are connected in angular relationship with respect to one another, said cutter element being insertable within said cavity so as to be in substantially a sliding engagement therewith and cooperating with said sidewall portions thereof so that said plurality of equal volumes are defined by at least six sides whereby said mold and said cutter element cooperate to divide the batch of dough into a plurality of substantially equally shaped portions which will create generally circular edible products when cooked.

2. The apparatus of claim 1 in which said shaped volumes are hexagonal in configuration.

3. The apparatus of claim 1 in which said wall segments of said cutter means are oriented to form a plurality of interconnected hexagon shapes, said cutter means being of the size to be slidingly engageable within said cavity of said mold with one of said wall segements of said cutter means extending parallel to and in generally abutting relationship with respect to each of said sidewall portions of said cavity.

4. The apparatus of claim 1 in which a first number of said straight wall segments of said cutter element are connected in end to end relationship with one another to form at least one generally centralized continuous cutter portion having at least six sides and a second number of said generally straight wall segments of said cutter element extending outwardly from said generally centralized cutter portion toward and into proximate relationship with said side wall portions of said cavity so as to be in substantial abutting relationship therewith.

5. The apparatus of claim 4 in which said centralized cutter portion and said shaped plurality of equal volumes are hexagonal in shape.

6. The apparatus of claim 4 in which said generally centralized cutter portion is hexagonal in form with said second number of said wall segments extending from each of the five apexes of the hexagon to a point generally abutting one of the intersections between the sidewall portions of the cavity.

* * * * *